US012097550B2

(12) United States Patent
Woidasky

(10) Patent No.: US 12,097,550 B2
(45) Date of Patent: Sep. 24, 2024

(54) BENDING MACHINE FOR BENDING WORKPIECES, IN PARTICULAR A PRESS BRAKE

(71) Applicant: BYSTRONIC LASER AG, Niederönz (CH)

(72) Inventor: Lars Woidasky, Gotha (DE)

(73) Assignee: BYSTRONIC LASER AG, Niederonz (CH)

( * ) Notice: Subject to any disclaimer, the term of this patent is extended or adjusted under 35 U.S.C. 154(b) by 0 days.

(21) Appl. No.: 18/287,000

(22) PCT Filed: Apr. 14, 2022

(86) PCT No.: PCT/EP2022/060011
§ 371 (c)(1),
(2) Date: Oct. 14, 2023

(87) PCT Pub. No.: WO2022/219120
PCT Pub. Date: Oct. 20, 2022

(65) Prior Publication Data

US 2024/0082901 A1 Mar. 14, 2024

(30) Foreign Application Priority Data

Apr. 15, 2021 (EP) .................................... 21168657

(51) Int. Cl.
*B21D 5/02* (2006.01)
*B21D 5/04* (2006.01)
(Continued)

(52) U.S. Cl.
CPC ............ *B21D 5/02* (2013.01); *B21D 5/0272* (2013.01); *B21D 5/04* (2013.01); *B30B 15/007* (2013.01); *B30B 15/026* (2013.01)

(58) Field of Classification Search
CPC .......... B21D 5/02; B21D 5/0272; B21D 5/04; B30B 15/007; B30B 15/026; B30B 15/044
(Continued)

(56) References Cited

U.S. PATENT DOCUMENTS

2007/0033981 A1* 2/2007 Gerritsen .............. B30B 15/007 72/389.5
2010/0229619 A1* 9/2010 Hansen ................. B30B 15/007 72/386

FOREIGN PATENT DOCUMENTS

DE 102010015919 A1 11/2010
JP H08150416 A 6/1996
(Continued)

OTHER PUBLICATIONS

English Language Translation of DE 10 2010 015919 A1.
(Continued)

*Primary Examiner* — Bobby Yeonjin Kim
*Assistant Examiner* — Jared O Brown
(74) *Attorney, Agent, or Firm* — BelayIP

(57) ABSTRACT

A bending machine for bending workpieces is disclosed. The bending machine includes a lower beam and an upper beam for forming a workpiece by bending along a bending line. A tool holder for receiving bending tools is provided on the lower beam and each end of the tool holder is associated with a recessed region which is formed in the lower beam overlapping with the respective end. The lower beam includes a central element and at least one side element arranged adjacent to one another in the thickness direction of the lower beam. Recessed regions are provided in the central element and/or in the width direction adjacent to the central element. The lower beam also includes a central region in which, during a bending operation of a workpiece, a force is
(Continued)

introduced via the tool holder both into the central element and into the at least one side element.

15 Claims, 5 Drawing Sheets

(51) Int. Cl.
*B30B 15/00* (2006.01)
*B30B 15/02* (2006.01)

(58) Field of Classification Search
USPC .................................................. 72/389.1, 455
See application file for complete search history.

(56) References Cited

FOREIGN PATENT DOCUMENTS

| | | | | | |
|---|---|---|---|---|---|
| JP | 2000343125 | A | | 12/2000 | |
| JP | 2015178131 | A | * | 10/2015 | ........... B21D 5/0272 |
| WO | WO-2013092507 | A1 | * | 6/2013 | ........... B21D 5/0272 |
| WO | WO2013/120123 | A1 | | 8/2013 | |

OTHER PUBLICATIONS

English Language Translation of WO 2013/120123 A1.
English Language Translation of JP 2000 343125 A.
English Language Translation of H08 150416 A.
IEEE Workproduct, International Search Report and Written Opinion of the International Searching Authority for PCT/EP2022/06011 dated Aug. 16, 2022.

* cited by examiner

BENDING MACHINE FOR BENDING WORKPIECES, IN PARTICULAR A PRESS BRAKE

CROSS REFERENCE TO RELATED APPLICATIONS

This application is a national stage of international application PCT/EP2022/060011, filed Apr. 14, 2022, which claims priority to European patent application 21168657.1, filed Apr. 15, 2021, the content of the both of which is herein incorporated by reference.

BACKGROUND OF THE INVENTION

Field of the Invention

The invention relates to a bending machine for bending workpieces and in particular to a press brake.

Bending machines comprise a lower beam and an upper beam for bending or forming workpieces in a bending manner. A tool holder or tool table on which lower tools are fixed is located on the lower beam. During the bending operation, the upper beam with the upper tools attached to it exerts a force on the corresponding workpiece, which is arranged on the tool holder between the upper beam and the lower beam. This force also causes an undesirable downward deflection of the lower beam, which negatively affects the bending result.

In order to avoid deflection of the lower beam during a bending operation, active crowning techniques are known in which a force is actively applied against the direction of deformation of the lower beam during the bending operation, e.g. via hydraulic cylinders. This is intended to eliminate the resulting deformation of the lower beam during bending. These active methods have the disadvantage that they lead to relatively high manufacturing costs, as sensors and suitable drives are usually required for active crowning.

In addition, there are systems for pre-crowning known from the prior art. In this case, the lower beam is suitably adapted in advance to the expected deformation during bending in the load plane, e.g. by milling a curved surface or placing appropriate plates or wedges underneath.

Description of Related Art

Press brakes are known from the publications DE 10 2010 015 919 A1 and DE 10 2010 015 920 A1, in which slots are provided in the lower beam in order to keep the relative deformations of the lower beam parallel to the bending line during bending. Stops in the region of the slots can be used to limit the deformation of the lower beam.

The provisioning of slots in the lower beam disclosed in the above publications has the disadvantage that this leads to a strong reduction in the rigidity of the lower beam, which can result in an undesired tilting of the lower beam or of the entire body of the machine. This results in inaccuracies when bending and leads to avoidable tensile forces on the anchoring of the bending machine.

The object of the invention is to create a bending machine in which a deformation of the lower beam during bending is counteracted without the mechanical stability of the bending machine being significantly impaired.

This object is achieved by the bending machine according to the claims.

The bending machine according to the invention is used for bending workpieces and in particular metal sheets. In a preferred variant, the bending machine is a press brake. The machine comprises a lower beam and an upper beam for forming a workpiece by bending along a bending line extending in a width direction of the bending machine. In other words, the corresponding workpiece positioned between the lower beam and the upper beam is bent by an application of force from the upper beam to the lower beam. A tool holder, in particular a tool table, is provided on the lower beam for receiving bending tools, wherein the tool holder can also be formed in one piece with the lower beam. Each end of the tool holder, lying in the width direction, is associated with a recessed region, which is formed in the lower beam overlapping with the respective end in the width direction. If necessary, this overlap may only consist of a corresponding end of the tool holder coinciding with an end of the associated recessed region. The recessed region serves to reduce the bending stiffness of the lower beam at the edges of the tool holder. Preferably, the recessed regions are arranged in mirror-symmetrically with respect to the center axis of the lower beam in the width direction.

Where terms are used here and in the following in connection with top or bottom or upper or lower (such as upper edge), these terms always refer to the vertical top-bottom direction in the operating position of the bending machine, i.e. the position of its intended use.

The lower beam of the bending machine according to the invention comprises a, in particular plate-shaped, central element and at least one, in particular plate-shaped, side element, all of which are arranged adjacent to one another in the thickness direction of the lower beam. The recessed regions defined above are provided in the central element and/or in the width direction adjacent to the central element and preferably exclusively at these locations. The term recessed region is to be understood in a broad sense. In particular, it can comprise one contiguous portion, but it can also comprise a plurality of separate sub-regions. In the case of a plurality of sub-regions, at least one sub-region and preferably each sub-region is formed to overlap with the respective end of the tool holder. In addition, the recessed region can be at least partially and, if necessary, entirely a cleared region without any material of the central element. Similarly, the recessed region can be, at least partially and, if necessary, in its entirety, a portion of lesser material thickness than in the remainder of the central element.

The lower beam of the bending machine according to the invention includes a central region below a central portion of the tool holder in the width direction (i.e. directly below the central portion), wherein during a bending operation of a workpiece, a force is introduced via the tool holder in the central region both into the central element and into the at least one side element. In this context, a central portion of the tool holder is to be understood as a portion comprising the centre of the tool holder lying in the width direction.

The lower beam further comprises, for each end of the tool holder, a free region which extends beneath the tool holder (i.e. directly below the tool holder) originating from the respective end of the tool holder and comprises that region of the recessed region associated with the respective end which lies beneath the tool holder (i.e. directly below the tool holder).

A respective free region is characterized by the fact that the central element and the at least one side element are arranged in this region in such a manner that in the respective free region during a bending operation of a workpiece, at least initially (i.e. at the beginning of the bending operation), a force is introduced exclusively into the central element (i.e. not into the at least one side element). This first effects the deformation of the central element and subsequently, via the central element, that of the at least one side element.

The construction of the lower beam in the form of a central element and at least one side element ensures a stable mechanical construction of the lower beam. Furthermore, a reinforced central region, in which a force is introduced via the tool holder into both the central element and the at least one side element during a bending operation of a workpiece, counteracts deformation of the lower beam, which is greatest in this region. At the same time, recessed regions in the central element or adjacent to it continue to ensure sufficient deformability in the edge regions of the lower beam, so that overall bending along a straight bending line is ensured.

Preferably, the central portion of the tool holder is symmetrically arranged between its ends in the width direction. Alternatively or in addition, the central portion occupies at least 50% of the total length of the tool holder in the width direction. This ensures a particularly stable construction of the lower beam.

In a further preferred embodiment, a respective free region (directly) adjoins the central region of the lower beam on each side in the width direction. In other words, the bending machine includes a central region and two free regions at the edge. This results in a mechanically simple construction of the lower beam.

As mentioned above, recessed regions can be portions with lower material thickness or without any material of the central element. Preferably, however, the recessed regions include cleared regions in which no material of the central element is present. In this way, very good deformability of the lower beam can be ensured in its edge portions. If necessary, only cleared regions can be provided as recessed regions.

In a further embodiment, at least one recessed region, and preferably each recessed region as seen in a plan view of the lower beam (i.e. as seen along its thickness direction), extends downwardly from a portion located at the upper edge of the central element and at which no tool holder is arranged and extends into a free region of the lower beam. This improves the deformability of the lower beam in its edge portions.

In a further preferred embodiment, the central element is mechanically connected to the at least one side element in the central region of the lower beam, wherein the mechanical connection is in particular a substance-to-substance bonded connection, preferably a welded connection. Nevertheless, the mechanical connection can also consist of or include an (additional) other connection, e.g. via force fit and/or form fit. Furthermore, the central element and the at least one side element do not necessarily have to be mechanically connected to one another in the central region of the lower beam, as long as the tool holder in the central region contacts both the central element and the at least one side element, thereby ensuring the introduction of force into both the central element and the at least one side element during a bending operation of a workpiece.

In a preferred variation of the above embodiment, the mechanical connection extends along the total length of the central region in the width direction. In another variant, the mechanical connection is formed at the upper edge of the central element. This ensures a uniform introduction of force into the central element and the at least one side element along the entire central region. In addition, the upper edge of the central element is particularly accessible, so that the mechanical connection can be provided at this point with little effort.

In a further, particularly preferred embodiment, the at least one side element is formed by two side elements between which the central element is located. This ensures uniform introduction of the bending force and prevents tilting of the lower beam.

In another preferred embodiment, the tool holder rests in its central portion both on an upper edge of the central element and on an upper edge of the at least one side element. This ensures good force introduction into both the central element and the corresponding side element.

In a further preferred variant of the bending machine according to the invention, the tool holder rests in a respective free region on an upper edge of the central element, wherein in the respective free region, however, an upper edge of the at least one side element is spaced apart from the tool holder. This provides a simple means of decoupling the central element from the at least one side element in such a manner that a force is introduced only into the central element during a corresponding bending operation of a workpiece. Furthermore, different absolute deformations of the central element and the at least one side element have no influence on the tool holder.

In a further preferred variant, one or more limiting means are formed in a respective free region in order to limit the deformation of the central element during a bending operation of a workpiece. Preferably, at least one limiting means, and in particular each limiting means, comprises a stop element which is arranged with a (mechanical) play in an opening in the central element, wherein the amount of play determines the amount of deformation of the central element up to its limitation. This allows for a simple realization of a limiting means. For example, the stop element can be a corresponding portion of a bolt extending through an opening in the central element.

In a further preferred embodiment, at least one limiting means, and preferably each limiting means, comprises an adjusting means by means of which the amount of deformation of the central element up to its limitation can be adjusted manually (i.e. by hand by an operator) and/or by means of actuators, e.g. in a hydraulic or motor-driven manner. In a preferred embodiment, the adjusting means comprises an eccentric by means of which the amount of deformation of the central element can be adjusted up to its limitation by rotation of the eccentric. In other words, the adjusting means includes a portion rotatable about an axis of rotation, the extent of which varies in the radial direction along the circumference about the axis of rotation. By means of an eccentric, a corresponding adjusting means can be realized in a simple manner.

In another preferred variant, the opposite edges of the lower beam in the width direction are mechanically connected to a component of a frame of the bending machine. This increases the stability of the bending machine.

In a further variant of the bending machine according to the invention, the lower beam is arranged adjacent, in its thickness direction, to a frame plate, preferably formed from a single-piece, which has an opening for feeding the workpieces to be bent into the bending machine, wherein there is preferably a mechanical connection between the lower beam and the frame plate. The frame plate increases the stability of the bending machine. Preferably, the frame plate is positioned behind the lower beam with respect to the direction of insertion of the workpiece into the bending machine.

BRIEF SUMMARY OF THE INVENTION

An exemplary embodiment of the invention is described in detail below with reference to the accompanying figures.

DETAILED DESCRIPTION OF THE INVENTION

Figure 1:
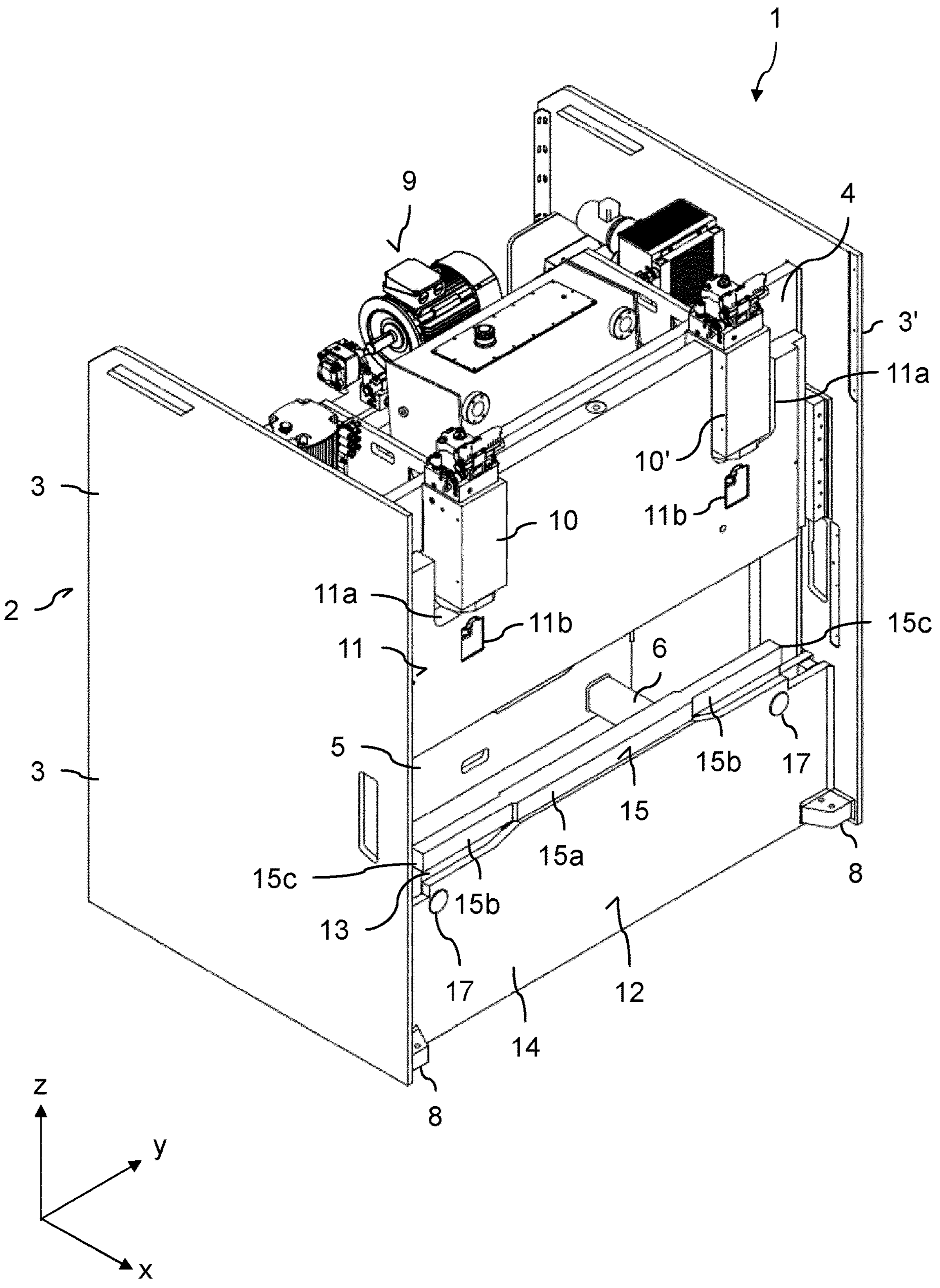
FIG. 1 shows a perspective view of an embodiment of a bending machine according to the invention.
Figure 2:
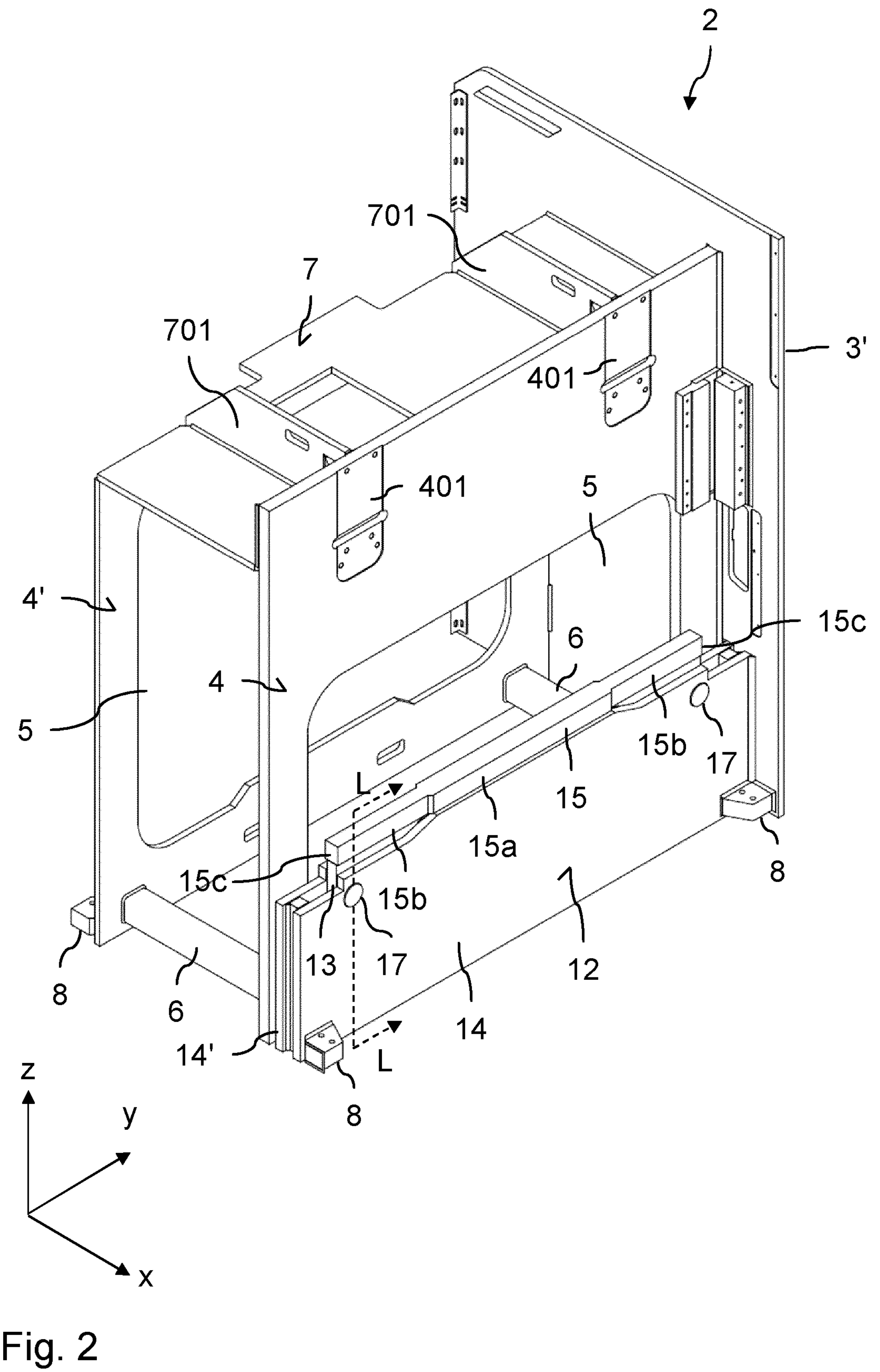
FIG. 2 shows a view corresponding to FIG. 1, wherein only the frame and the lower beam of the bending machine of FIG. 1 are shown.

In the following, an embodiment of the invention is described based on a bending machine in the form of a press brake. A perspective view of this press brake is shown in FIG. 1, where it is designated with reference sign 1. FIG. 1 and FIG. 2 show a spatial coordinate system for describing the directions of the bending machine. The x-direction corresponds to the depth direction of the bending machine and a workpiece to be bent is inserted into the bending machine in the direction opposite to the x-direction. In contrast, the y-direction is the width direction of the bending machine. Both directions lie in a horizontal plane. The z-direction is the vertical direction and corresponds to the height direction of the bending machine.

The bending machine 1 comprises a frame 2 which includes, among other things, two side stands 3, 3' and a front frame plate 4 and a rear frame plate 4'. The structure of the frame can be seen very clearly from the perspective view of FIG. 2, in which only the lower beam 12 of the bending machine, described below, is shown in addition to the frame. Furthermore, the side stand 3 has been omitted for reasons of clarity.

As can be seen from FIG. 2, each of the two frame plates 4 and 4' is a single-piece component in which corresponding openings 5 are provided. Two struts 6 are provided in the lower region between the two frame plates 4 and 4'. Furthermore, corresponding anchoring means 8 are formed in the corners of the side stands 3 and 3', via which the bending machine is anchored to the ground. A workpiece or metal sheet is inserted horizontally into the bending machine through the opening 5 in the front frame plate 4. The inserted metal sheet is then bent by moving the upper beam 11 shown in FIG. 1 downward, which presses on the lower beam 12, effecting a forming of the metal sheet in between.

To move the upper beam 11, hydraulic actuators 9 known per se are used, which are provided in the upper region of the bending machine and are not described in detail. A large part of the actuators is supported by the reinforcement plate 7 shown in FIG. 2, which has vertically upwardly extending reinforcement ribs 701. The hydraulic actuators 9 comprise two hydraulic cylinders 10 and 10', which can be seen in FIG. 1. The front end of the rod, which can be moved out of the respective cylinders, is received in corresponding openings **11*b* in the upper beam 11 so that the upper beam can both be pressed down as well as retracted upwards. The two cylinders 10 and 10' are attached to corresponding mounting portions 401 of the front frame plate 4 (see FIG. 2) and are located in corresponding recesses 11*a* of the upper beam 11 as shown in FIG. 1. These recesses extend downward from the upper side of the upper beam 11**.

To effect the desired bending of the fed metal sheet for the corresponding bending operation, lower tools (not shown) are used on the upper side of the lower beam 12 and upper tools (not shown) on the lower side of the upper beam 11. The lower tools form a so-called die into which a corresponding punch, formed by the upper tools, is pressed via the hydraulic actuators 9 by moving down the upper beam 11, thereby causing the bending of the metal sheet lying in between. As can be seen from FIG. 1 and FIG. 2, a tool holder 15, designed as a tool table in this exemplary embodiment, is located on the upper side of the lower beam 12 and is provided for fastening the lower tools. The tool holder includes a thickened central portion **15*a* and two edge portions 15*b* of lesser thickness. The opposite ends of the tool holder 15 in the width direction y are designated with reference sign 15*c* in FIG. 1 and FIG. 2. Furthermore, in these figures, two bolts provided in the lower beam 12 are visible, which represent the limiting means 17** described further below.

The lower beam 12 comprises three plate-shaped elements 13, 14 and 14' arranged parallel to one another in the x-direction. This plate-shaped structure of the lower beam 12 can be seen in FIG. 2 and FIG. 4, among others. As can be seen there, the lower beam 12 includes a plate-shaped central element 13 located between a front plate-shaped side element 14 and a rear plate-shaped side element 14'. The tool holder 15 rests on the horizontally extending upper edge **13*a* of the central element 13 (see FIG. 3 and FIG. 4) along its entire length in the width direction. In the edge portions 15*b*, the tool holder is only in contact with the central element 13, whereas in the central thickened portion 15*a*, it rests on both the central element 13 and the side elements 14, 14'**.

Figure 3:
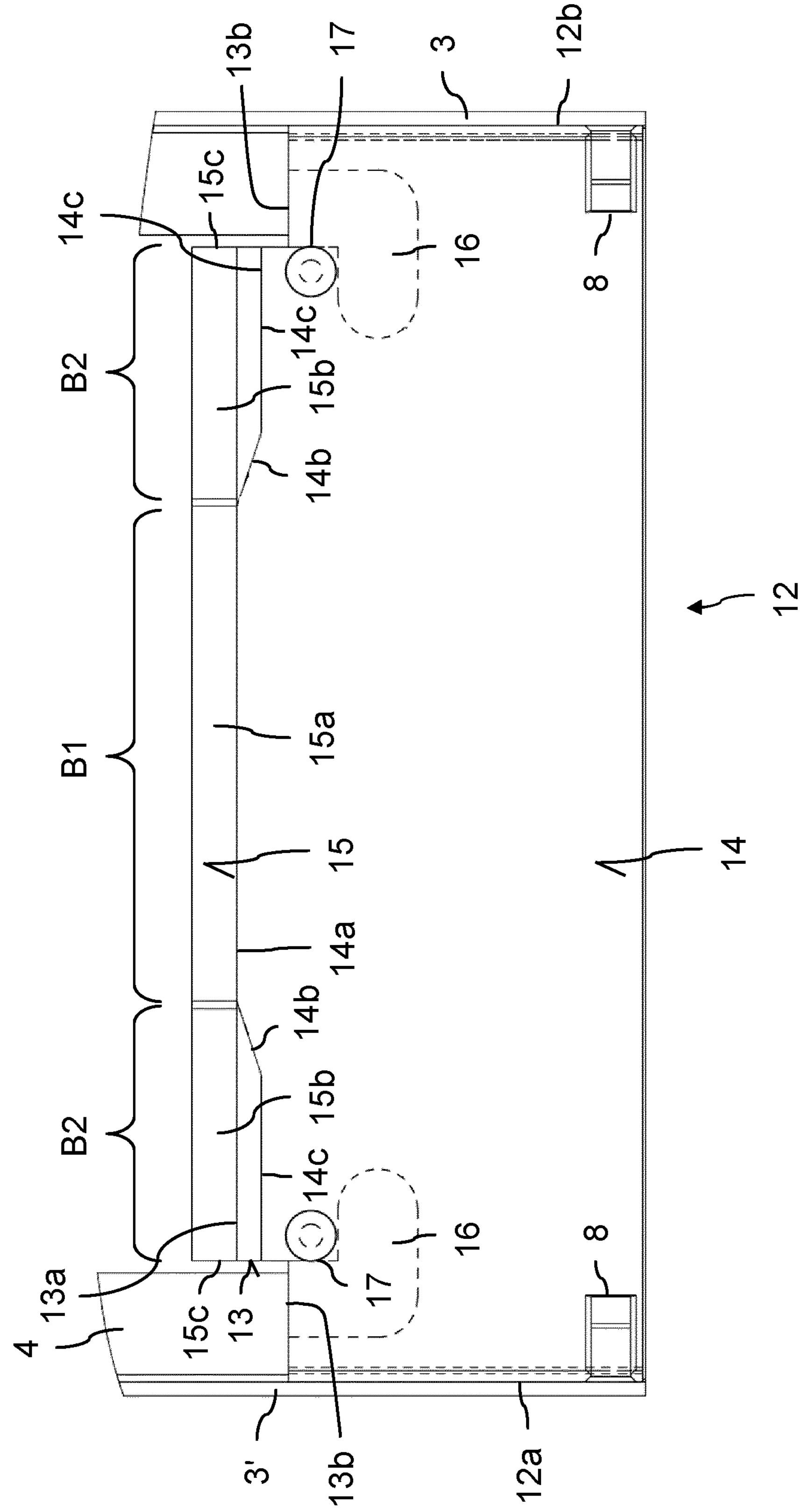
FIG. 3 shows a plan view from the front of the lower beam of the bending machine of FIG. 1 and FIG. 2.
Figure 4:
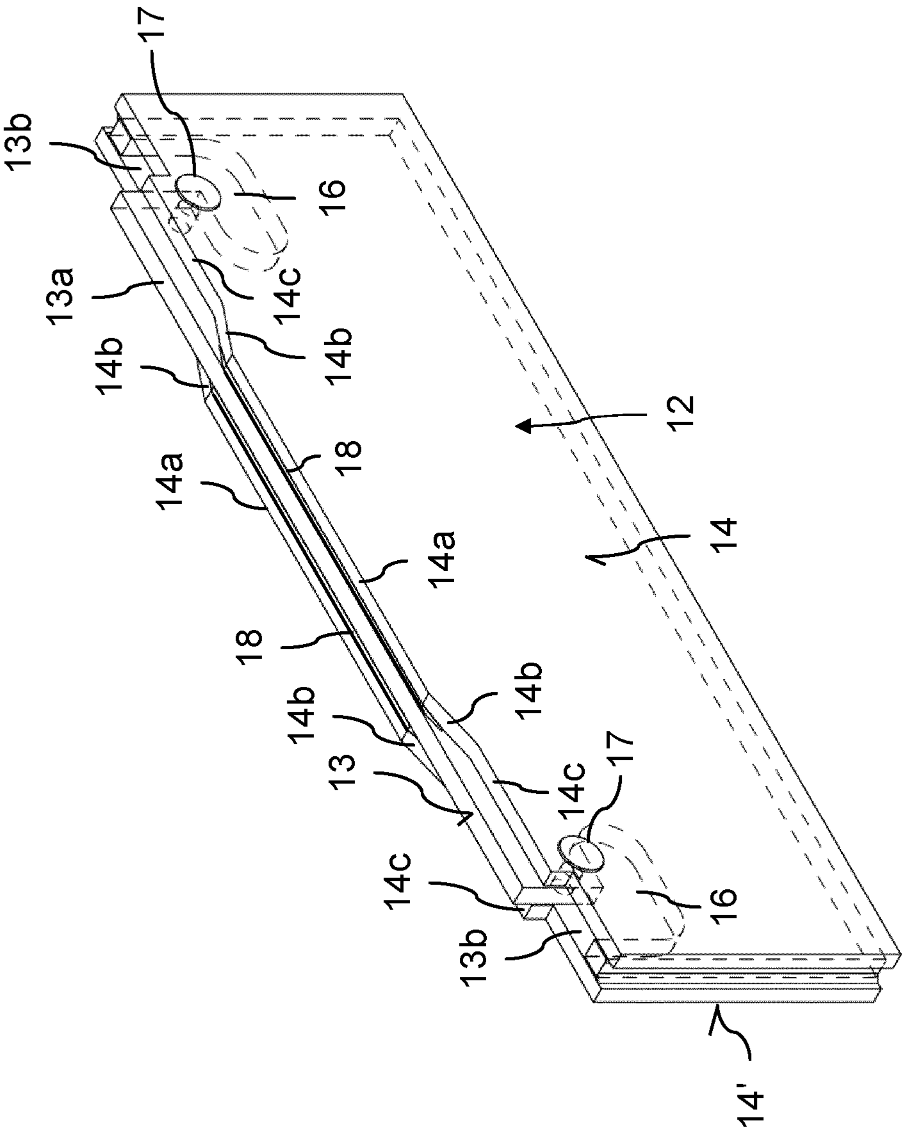
FIG. 4 shows a perspective view of the lower beam of the bending machine of FIG. 1 and FIG. 2.

FIG. 3 again shows a plan view of the upper beam 12 from the front, wherein the contour of the central element 13 is indicated by dashed lines in both FIG. 3 and FIG. 4. As can be seen there, the lower beam 12 extends in the width direction between its two edges **12*a* and 12*b*. In order to suspend the lower beam stably from the frame 2, it is mechanically connected in a rigid manner at its edges 12*a* or 12*b* via the side elements 14, 14' to the corresponding side stands 3 or 3', preferably via a welded connection. To increase the stability, the rear side of the side element 14' is preferably also mechanically connected to the front frame plate 4** in a rigid manner.

Along the width direction, the lower beam 12 includes a central region B1 and two free regions B2 adjacent thereto. The position and length of the central region B1 corresponds to the position and length of the central portion **15*a* of the tool holder 15 in the width direction. In contrast, in the width direction, the position and length of each free region B2 corresponds to the position and length of an overlying edge portion 15*b* of the tool holder 15. The functions of the individual regions B1 and B2** are described in more detail below.

The tool holder 15 is mechanically connected in a rigid manner to the upper edge **13*a* of the central element 13 on the lower side, e.g. via a weld connection. The upper edge of the two side elements 14, 14' extends parallel to and at the same height as the upper edge 13*a* of the central element 13 only in the central portion 15*a* of the tool holder 15. This portion of the upper edge of the side elements is designated with reference sign 14*a* in FIG. 3 and FIG. 4. If necessary, this portion of the upper edge can also be welded to the lower side of the tool holder 15. The upper edge of the two side elements 14, 14' can alternatively be located in the central portion 15*a* of the tool holder 15 below the upper edge 13*a* of the central element 13**.

The portions of the upper edge **14*a* of the respective side elements 14, 14' are adjoined on each side of the region B1** by sloping, downwardly extending portions of the upper edge 14$b$, which in turn merge into straight horizontal portions of the upper edge 14$c$ arranged at a distance from the portion of the upper edge 13$a$ of the central element 13 above them. Here, the portions of the upper edge 14$b$ and 14$c$ are located in the free regions B2 of the lower beam 12. As a result of the fact that the portions of the upper edge 14$c$ of the side elements 14, 14' are arranged lower than the portion of the upper edge of the central element 13 above them, only an introduction of force into the central element 13 is effected in the free regions B2 at the beginning of the bending operation. To the left and right of the portions of the upper edge 14$c$ are lower horizontal portions of the upper edge of the central element 13 and the side elements 14, 14'. In each of the two lower portions of the upper edge of the central element 13, an opened portion 13$b$ is provided to form an upper end of a recessed region 16 formed as a corresponding clearance in the central element 13.

As shown in FIG. 3 and FIG. 4, the recessed region 16 first extends downward from the open portion 13$b$ and then bends 90° to then extend horizontally beneath the tool holder 15. The two recessed regions 16 reduce the flexural rigidity of the central element 13 in the region of the two ends 15$c$ of the tool holder 15. Instead of recessed regions 16 in the form of clearances containing no material, a reduction in bending stiffness can also be achieved by a corresponding portion with a smaller thickness of the central element. Furthermore, the recessed regions 16 can also be formed by shortening the central element 13 in the width direction y relative to the side elements 14, 14', so that the opposite ends of the central element in the width direction are located in a respective region B2 in front of the corresponding end 15$c$ of the tool holder 15. A limiting means 17 in the form of a bolt is located above each of the two recessed regions 16, which is explained further below with reference to FIG. 5.

The two free regions B2 of the lower beam 12 are characterized by the fact that, on the one hand, their geometrical moment of inertia is reduced by the recessed regions 16 and, on the other hand, in these regions the central element 13 and the side elements 14 do not have a substance-to-substance bonded, force-fitting or form-fitting connection to one another that prevents deformation of the central element 13 relative to the side elements 14, 14'. In contrast to this, the central element 13 and the side elements 14, 14' in the present example are welded together at their upper edges 13$a$ and 14$a$ in the region 131. The corresponding weld seams are indicated by thick lines in FIG. 4 and designated with reference sign 18. Via this welding connection, the geometrical moment of inertia is increased in the central region B1 compared to the free regions B2.

The increased geometrical moment of inertia in the central region B1 counteracts deformation of the lower beam in this region when a force is introduced during a bending operation. Such a deformation is undesirable as it has a negative effect on the bending result of the corresponding workpiece. In contrast, in the free regions B2 the corresponding bending force is only introduced into the central element 13, which can bend due to the reduction in bending stiffness caused by the recessed regions 16. Specifically, a deformation of the leg of the central element 13 is achieved, which is located above the recessed region 16 and in which the limiting means 17 is also positioned. The deformation of the free regions B2 counteracts the effect that, during a bending operation, the lower beam without portions with reduced bending stiffness would deform less in the edge region than in the centre.

The combination of reinforcing the lower beam in the central region B1 and reducing the bending stiffness in the free regions B2 can ensure a more uniform bending of the workpiece overall. In particular, the force is introduced symmetrically along the tool holder 15, thereby ensuring a significantly improved relative deformation of the tool holder 15, which leads to a better bending result.

Figure 5:
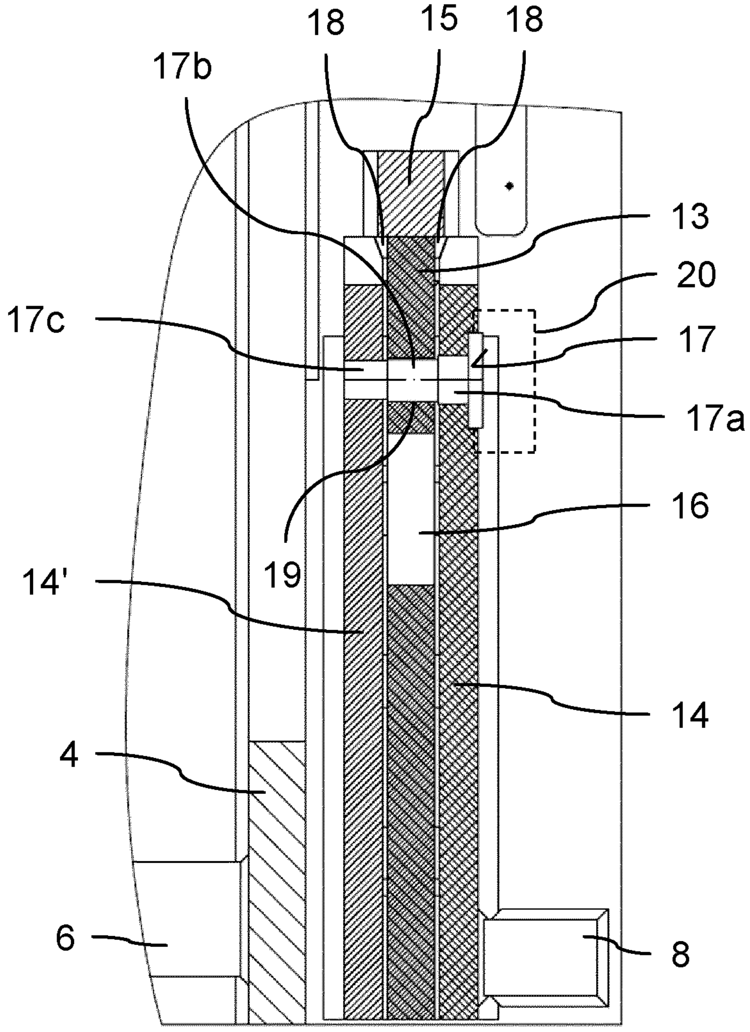
FIG. 5 shows a sectional view through the lower beam along the line L-L of FIG. 2.

FIG. 5 shows a sectional view along the line L-L of FIG. 4, from which the structure of the limiting means 17 can be seen. The limiting means is designed in the form of a bolt and comprises a cylindrical portion 17$a$ inserted in a corresponding opening of the side element 14. This cylindrical portion is followed by an adjusting means 17$b$ designed as an eccentric. In the embodiment of FIG. 5, the eccentric has a flat portion on its upper side and is otherwise cylindrical. The adjusting means 17$b$ is received in a corresponding opening 19 of the central element 13. Adjacent to the adjusting means 17$b$ is another cylindrical portion 17$c$, which is received in an opening of the side element 14'.

The extent of the adjusting means 17$b$ in the vertical direction is selected such that there is a play, preferably from 0.05 mm to 5.0 mm and more preferably from 0.1 mm to 1 mm, between the upper flat portion and the opposite upper side of the opening 19 in the central element 13. Due to this play, it is possible to flexibly deform the leg of the central element 13, which is located above the recessed region 16, during a bending operation. The amount of play determines the maximum deformation and, in this sense, limits the amount of deformation.

In a modified embodiment of FIG. 5, the adjusting means 17$b$ of the limiting means 17 has a plurality of flat portions at different distances from the longitudinal axis of the bolt. In this case, the bolt can be manually rotated by an operator using a suitable tool on its side located on the side element 14, i.e. various flat portions can be aligned in the upward direction. The eccentric design of the adjusting means 17$b$ allows the play of the limiting means 17 to be changed and, in this sense, the amount of deformability of the central element 13 to be adjusted.

Instead of or in addition to manual rotation of the bolt, actuators can also be provided to rotate the bolt or limiting means 17 in a suitable manner. These actuators are only schematically indicated by a dashed rectangle in FIG. 5 and are designated with reference sign 20. The actuators can be hydraulic or motor-driven, for example, and cause the bolt to rotate. By means of the actuators, the adjustment of the play and thus the deformability of the central element 13 is simplified, since the operator no longer has to turn the bolt manually. In addition, it may be possible to provide several bolts instead of a single bolt in the respective free region of the lower beam to limit the deformability. Here, if necessary, each individual bolt may in turn contain an eccentric portion for adjusting the play.

The embodiments of the invention described in the foregoing provide a number of advantages. In particular, by combining a reinforced central region of a lower beam with less rigid free regions at its edge, a uniform rectilinear deformation of the upper edge of the lower beam can be achieved during a bending operation, resulting in significantly better bending results. To this end, a plate-shaped structure of the lower beam consisting of a central element and adjoining side elements is used. During a bending operation, this structure ensures that force is introduced into the central region of the lower beam via both the central element and the side elements, whereas in the free regions only the central element is used for force introduction.

The invention claimed is:

1. A bending machine for bending a workpiece, the bending machine comprising a lower beam and an upper beam, for forming the workpiece by bending along a bending line which extends in a width direction of the bending machine, wherein a tool holder for receiving bending tools is provided on a lower beam, and each end of the tool holder lying in the width direction is associated with a recessed region formed in the lower beam and overlapping with the respective end of the tool holder, wherein:

the lower beam comprises a plate-shaped central element and at least one plate-shaped side element, wherein the plate-shaped central element and the at least one plate-shaped side element are arranged adjacent to one another in a thickness direction of the lower beam, wherein the recessed-region is provided in the central element and/or in the width direction adjacent to the central element;

the lower beam comprises a central region below a central portion of the tool holder in the width direction, wherein the tool holder in the central region contacts both the central element and the at least one side element, thereby during a bending operation of the workpiece a force is introduced via the tool holder in the central region both into the central element as well as into the side element;

the lower beam comprises, for each of the ends of the tool holder, a free region which extends beneath the tool holder originating from each of the ends of the tool holder and comprises portions of the recessed regions associated with each of the ends which lies beneath the tool holder;

the central element and the at least one side element are arranged in a respective one of the free regions in such a manner that the upper edge of the at least one side element is arranged lower than the upper edge of the central element above it, thereby in the respective free region, during a bending operation of the workpiece, at least initially, the force is introduced exclusively into the central element.

2. The bending machine according to claim 1, wherein the central portion of the tool holder is symmetrically arranged between each of the ends in the width direction and/or occupies at least 50% of a total length of the tool holder in the width direction.

3. The bending machine, according to claim 1, wherein a respective one of the free regions adjoins the central region of the lower beam on each side in the width direction.

4. The bending machine according to claim 1, wherein the recessed regions comprise one or more cleared regions in which no material of the central element is located.

5. The bending machine according to claim 1, wherein at least one of the recessed regions, as seen in a plan view of the lower beam, extends downwardly from a portion of the central element located at an upper edge of the central element and at which no tool holder is arranged and extends into a free region of the lower beam.

6. The bending machine according to claim 1, wherein the central element is mechanically connected to the at least one side element in the central region of the lower beam, wherein the mechanical connection is a substance-to-substance bonded connection, a welded connection, and/or wherein the mechanical connection extends along the total length of the central region in the width direction and/or wherein the mechanical connection is preferably formed at an upper edge of the central element.

7. The bending machine according to claim 1, wherein the at least one side element is formed by two side elements between which the central element is located.

8. The bending machine according to claim 1, wherein the central portion of the tool holder rests both on an upper edge of the central element and on an upper edge of the at least one side element.

9. The bending machine according to claim 1, wherein the tool holder rests in a respective one of the free regions on an upper edge of the central element, wherein in the respective free region an upper edge of the at least one side element is spaced apart from the tool holder.

10. The bending machine according to claim 1, wherein one or more limiting means are formed in at least one of the free regions in order to limit deformation of the central element during a bending operation of the workpiece.

11. The bending machine according to claim 10, wherein at least one of the one or more limiting means comprises a stop element which is arranged with a play from 0.05 mm to 5.0 mm in an opening in the central element, wherein the amount of play determines the amount of deformation of the central element up to a limitation.

12. The bending machine according to claim 10, wherein each of one or more limiting means comprises an adjusting means, by means of which an amount of deformation of the central element up to a limitation can be adjusted manually and/or by means of actuators.

13. The bending machine according to claim 12, wherein the adjusting means comprises an eccentric, by means of which the amount of the deformation of the central element can be adjusted up to the limitation by rotation of the eccentric.

14. The bending machine according to claim 1, wherein opposite edges of the lower beam in the width direction are mechanically connected to a component of a frame of the bending machine.

15. The bending machine according to claim 1, wherein the lower beam is arranged adjacent, in the thickness direction, to a frame plate which has an opening for feeding the workpieces to be bent into the bending machine, wherein there is a mechanical connection between the lower beam and the frame plate.

* * * * *